UNITED STATES PATENT OFFICE.

ADOLPH SCHREIBER, OF NEW YORK, N. Y.

IMPROVEMENT IN TREATING SACCHARINE LIQUIDS.

Specification forming part of Letters Patent No. 116,504, dated June 27, 1871.

*To all whom it may concern:*

Be it known that I, Dr. ADOLPH SCHREIBER, of the city, county, and State of NEW YORK, have invented a new and useful Improvement in Treating Saccharine Juices; and I do hereby declare the following to be a full, clear, and exact description thereof, which will enable those skilled in the art to make and use the same.

This invention consists in exposing saccharine juices to the action of a weak solution of sulphurous acid, which is drawn into the vacuum-pan, while the boiling progresses, in such a manner that the juice or sirup is brought in intimate contact with the sulphurous acid, and thereby the sirup is defecated and bleached and its subsequent crystallization is facilitated.

In carrying out my invention I prepare and treat saccharine juice in the usual manner until it reaches the vacuum-pan. While the juice or sirup is being boiled in the vacuum-pan I introduce therein a weak solution of sulphurous acid, containing about one-half pound of sulphurous acid in one hundred pounds of water. In some cases the solution may be a little stronger, reaching as much as one pound of acid to one hundred pounds of water, and in other cases the solution may be made somewhat weaker than above stated. Of this solution of sulphurous acid I use about one hundred pounds to ten thousand pounds of sirup, and I introduce the same gradually into the vacuum-pan while the boiling progresses, so that all parts of the sirup are brought in intimate contact with the sulphurous acid. By the action of this acid the vegetable gums contained in the sirup are destroyed, the sirup is defecated and bleached, and the subsequent crystallization of the same is materially facilitated, so that the quality of the sugar is improved and the yield of sugar is increased.

What I claim as new, and desire to secure by Letters Patent, is—

The within-described process of treating saccharine juices by exposing the same, while in the vacuum-pan, to the action of sulphurous acid in solution, substantially in the manner herein shown and described.

This specification signed by me this 6th day of June, 1871.

DR. ADOLPH SCHREIBER.

Witnesses:
W. HAUFF,
E. F. KASTENHUBER.